United States Patent [19]
Thompson

[11] 3,874,697
[45] Apr. 1, 1975

[54] SHIELD FOR CONTROLLING ROAD SPRAY

[76] Inventor: James C. Thompson, 7605 Schaaf Dr., Richmond, Va. 23229

[22] Filed: May 2, 1973

[21] Appl. No.: 356,574

[52] U.S. Cl. .................................... 280/154.5 R
[51] Int. Cl. ........................................ B62d 25/16
[58] Field of Search ............... 280/154.5 R; 180/84

[56] References Cited
UNITED STATES PATENTS

| | | | |
|---|---|---|---|
| 2,844,388 | 7/1958 | Rheeling | 280/152 R |
| 3,006,658 | 10/1961 | Wenham et al. | 280/154.5 R |
| 3,721,459 | 3/1973 | Lea | 280/154.5 R |
| 3,743,343 | 7/1973 | Grote et al. | 280/154.5 R |

Primary Examiner—Allen N. Knowles
Attorney, Agent, or Firm—Shlesinger, Arkwright, Garvey & Dinsmore

[57] ABSTRACT

This invention is a shield for controlling the road spray created by a tandem wheeled vehicle traveling on wet pavement. The device includes a V-shaped support member having a top cover and side cover secured thereto for the purpose of containing the spray created by the rotating wheels. A vertically depending separator plate is secured to the horizontal portion of the support member at a position between the wheels and is provided with an arcuate directing plate which serves to deflect downwardly any water picked up by the front wheel. The device is secured to the vehicle frame by means of an arm extending laterally from the inboard side of the support member.

12 Claims, 6 Drawing Figures

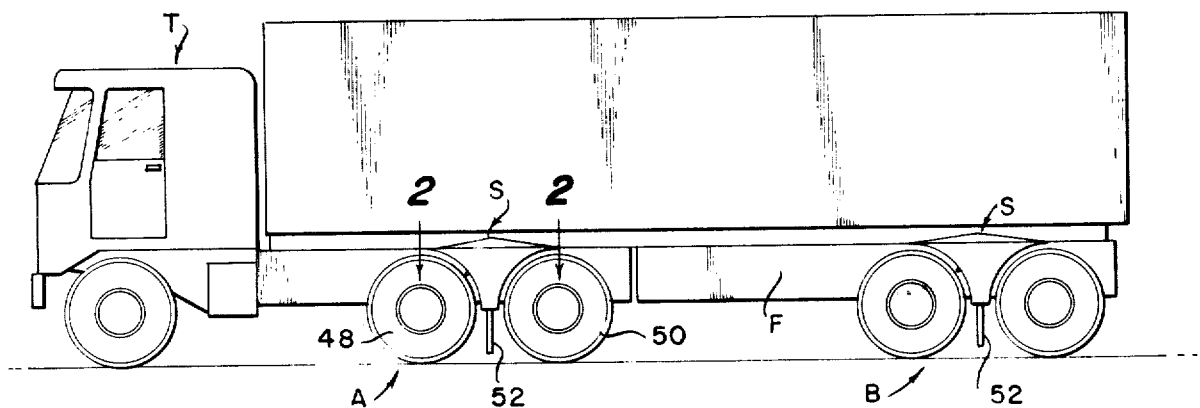
Fig.1
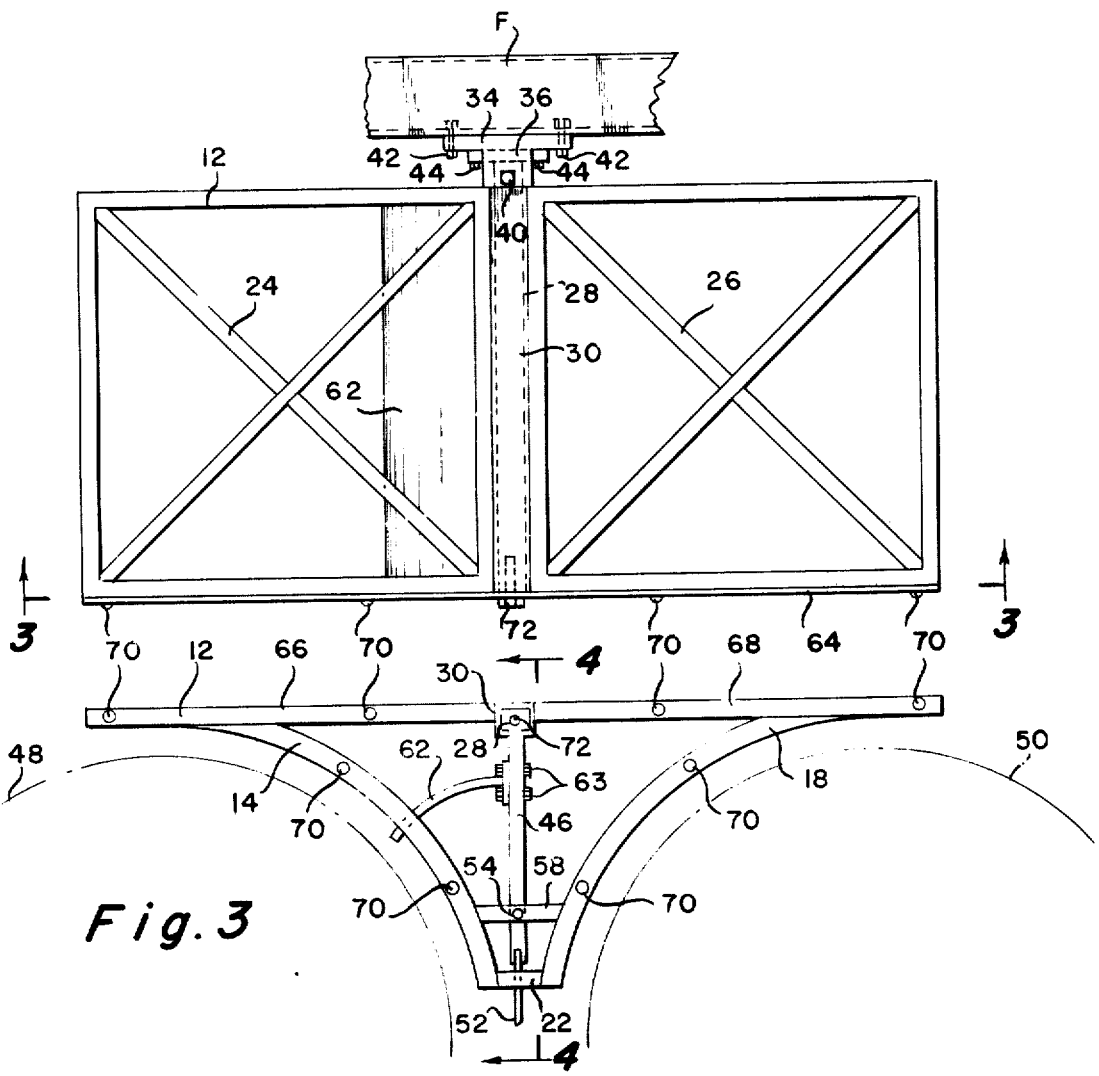
Fig.2
Fig.3

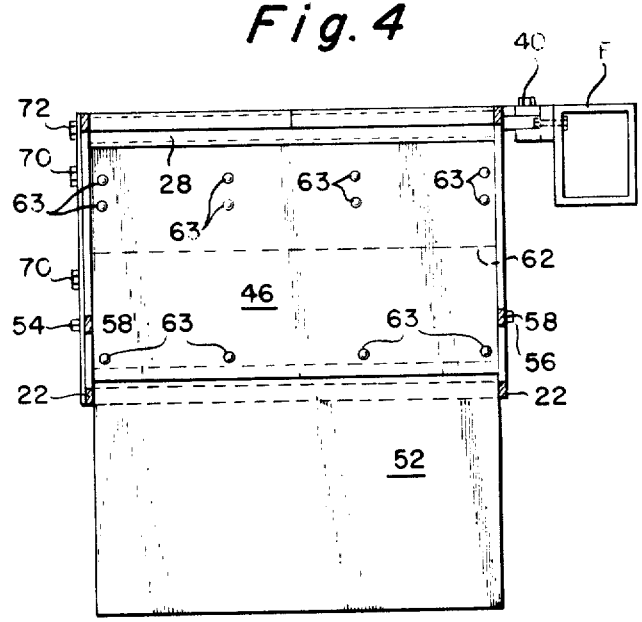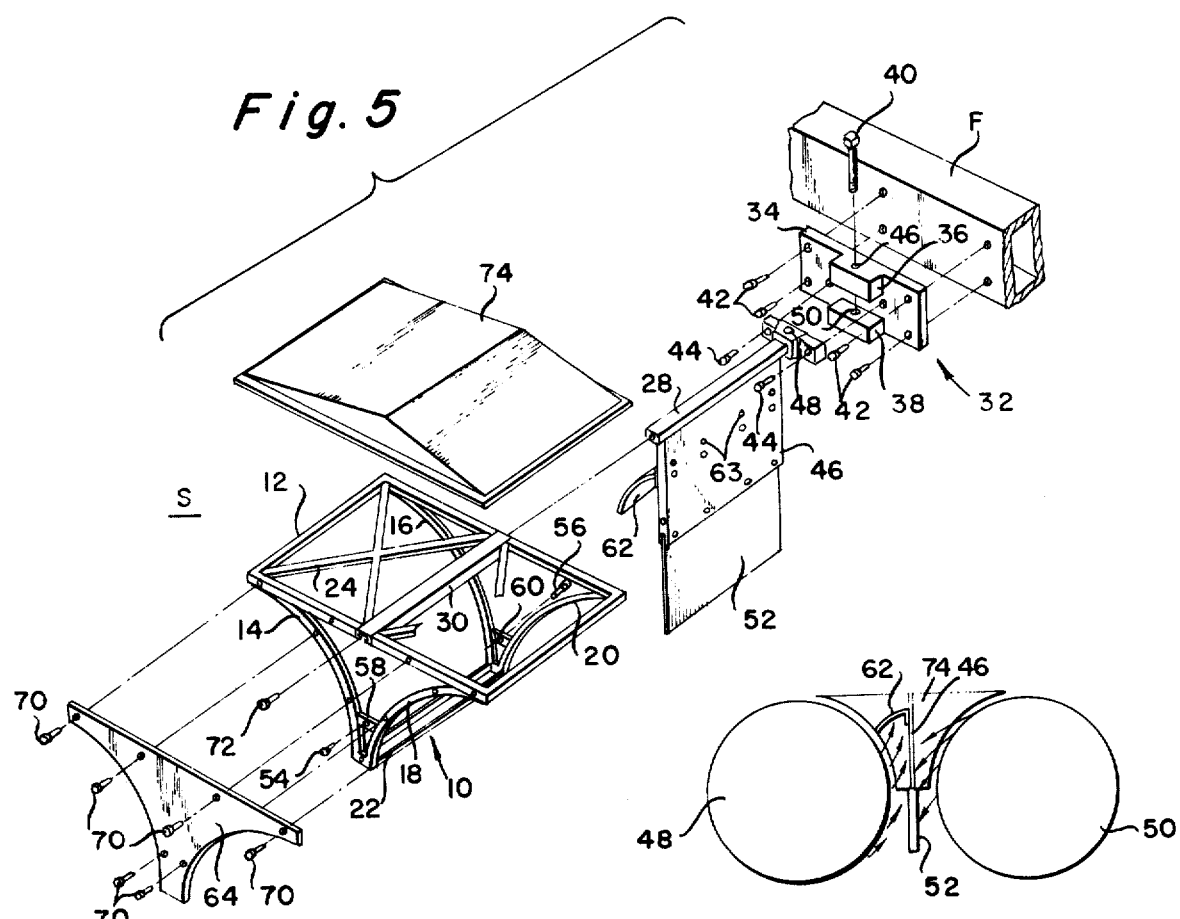

SHIELD FOR CONTROLLING ROAD SPRAY

BACKGROUND OF THE INVENTION

In situations where there is an appreciable accumulation of water on the surface of a high speed highway, fast moving trucks emit a high volume of spray from the tandem wheels. Due to the fact that the wheels of the trucks are so large, the spray which is emitted laterally will normally strike a passing vehicle at the level of the windshield thereby reducing visibility to zero. Since the volume and velocity of the road spray is so great, the average windshield wiper is unable to effectively remove the water from the windshield.

The lateral spray is created when the volume of water thrown rearward and upward by the lead tire meets the volume of water thrown forward and downward by the following tire. The meeting of these two sprays occurs in the area between the tires where the combined spray is forced outwardly along the path of least resistance. Since the resulting spray is a combination of two volumes of moving water, it's force and density is much greater then that of the spray created by a single wheel.

While the art is replete with devices for preventing mud and water being thrown rearwardly toward a following vehicle, the problem of reducing lateral spray has not been effectively solved.

OBJECTS OF THE INVENTION

It is, therefore, an object of this invention to provide a shield for controlling road spray from the tandem wheels of a vehicle which reduces lateral spray to a fine mist better able to be accommodated by the windhield wiper of a passing vehicle.

A further object of this invention is to provide a road spray shield which is easy to install on a vehicle without the necessity for elaborate supporting structure.

A further object of this invention is to provide a road spray shield which may be mounted above and between the wheels so as to render them accessible for maintenance, inspection, etc.

Yet another object of this invention is to provide a road spray shield which lends itself to use on vehicles of different frame structures and wheel arrangements without the requirement for material modifications.

A still further object of this invention is to provide a road spray shield having a structure of considerable durability.

Yet another object of this invention is to provide a road spray shield which prevents water thrown by the front and rear tandem wheels from combining and creating a lateral spray.

A still further object of this invention is to provide a road spray shield which deflects downwardly the water thrown up by the front wheel of the tandem set.

SUMMARY OF THE INVENTION

A shield for controlling road spray for use in combination with a vehicle having a frame and at least one set of tandem wheels. The shield has a support member secured in it's inboard side to the vehicle frame and includes a horizontal portion positioned above the wheels of the tandem set. A vertical separator plate, which has a downwardly concave director plate secured thereto, depends from the horizontal portion of the support member. The director plate extends from a separator plate toward the front wheel of the tandem set. A vertical cover is secured to the outboard side of the support member and a horizontal cover is secured to the horizontal portion of the support member.

BRIEF DESCRIPTION OF THE DRAWINGS

FIG. 1 is a side elevational view of a five axle truck on which the invention has been installed;

FIG. 2 is a sectional view taken on line 2—2 of FIG. 1 and viewed in the direction of the arrows;

FIG. 3 is a sectional view taken along the line 3—3 of FIG. 3 and viewed in the direction of the arrows;

FIG. 4 is a sectional view taken along the line 4—4 of FIG. 3 and viewed in the direction of the arrows;

FIG. 5 is a partially cut away, exploded perspective view of the invention and a portion of a vehicle frame;

FIG. 6 is a diagrammatic representation of the invention showing its relation to the wheels of the tandem set.

DESCRIPTION OF THE INVENTION

In FIG. 1, the shield S is shown attached to a tractor trailer having tandem wheel sets A and B. In particular, the shield S is fastened to the truck frame F at a point above and between the wheels of the sets A and B thereby rendering the wheels accessible for maintenance, etc.

Referring now to FIG. 5, the shield includes a support member 10 having a generally rectangular horizontal portion 12 to which are secured opposing arcuate sections 14, 16, 18 and 20. The arcuate sections 14, 16, 18 and 20 depend from horizontal portion 12 and are joined together by rectangular frame 22. Crossbraces 24 and 26 lend additional stability to portion 12, which supports the entire assembly.

The support member 10 is secured to the vehicle frame F by means of a laterally extending arm 28 which cooperates in tongue and groove fashion with sleeve 30. The suspension bar or arm 28 is fastened to frame F by bracket assembly 32. Bracket 32 comprises a fastening plate 34 having a pair of vertically aligned apertured extensions 36 and 38, fastening bolt 40 and mounting bolts 42. The suspension bar 28 is secured to bracket 32 by means of bolts 44 anchored in plate 34 and fastening bolt 40 which passes through aligned apertures 46, 48 and 50.

Secured to and depending from suspension bar 28, is a separator plate 46 which is preferably as wide as the wheels (or dual wheels) 48 and 50. The separator plate 46 may also be provided with a weighted, flexible shield 52 which hangs therefrom. The plate and shield assembly 46, 52 extends through rectangular frame 22 and is rigidly secured to arcuate sections 14, 16, 18 and 20 by means of bolts 54 and 56 passing through cross-brace 58 and removable cross-brace 60 and anchored in plate 46. A downwardly concave director plate 62 is bolted by means of bolts 63 to that side of separator plate 46 which faces the front wheel 48 of the tandem set.

A lateral cover 64, the shape of which generally conforms to the outboard support elements 66, 68, 14 and 18, is fastened thereto by means of bolts or rivets 70 and axial suspension bar bolt 72. The last mentioned bolt 72 which is threaded into suspension bar 28, prevents the sleeve 30 and support member assembly 10 from sliding off suspension bar 28. Upper cover 74 is fastened to the horizontal portion 12 of support member 10 by any suitable means.

OPERATION

The operation of the device is best illustrated in FIG. 6.

The separation plate 46 and shield 52 form a barrier between the front wheel (or wheels) 48 and the rear wheel (or wheels) 50 thereby preventing the spray thrown upward and rearward by wheel 48 from meeting the spray thrown forward by wheel 50. In this manner, the lateral spray normally resulting from the collision of the two sprays is substantially reduced. The director plate 62 catches the upcoming water produced by wheel 48 and deflects it downward thereby preventing it from reaching the windshield level of a passing vehicle. The upper cover or hood 74 and lateral cover 64 confines the secondary spray created by the primary sprays hitting plates 46 and 62 and deflects them toward the vehicle and the pavement.

While this invention has been described as having a preferred design, it will be understood that it is capable of further modification. This application is, therefore, intended to cover any variations, uses or adaptations of the invention following the general principles of the invention and including such departures from the present disclosure as come within known or customary practice within the art to which this invention pertains, and as may be applied to the essential features hereinbefore set forth and fall within the scope of the invention or the limits of the appended claims.

I claim:

1. A shield for controlling road spray from the tandem wheels of a vehicle comprising:
   a. a support means,
   b. a separator plate having front and rear faces and inside and outside edges,
   c. said separator plate being secured to said support means and lying generally in a vertical plane,
   d. a first cover member secured to said support means and lying above said separator plate generally in a horizontal plane,
   e. said first cover extending fore and aft of said separator plate,
   f. a director plate secured to said front face of said separator plate,
   g. said director plate extending from said separator plate in a direction away from said horizontal plane and forming an acute angle with said vertical plane,
   h. a second cover member secured to said support means and lying generally in a plane at right angles to said horizontal and vertical planes,
   i. said second cover member being adjacent said outside edge of said separator plate and extending fore and aft of said separator plate.

2. A shield for controlling road spray as in claim 1 and wherein:
   a. said support means has a horizontal portion substantially parallel to said horizontal plane.

3. A shield for controlling road spray as in claim 2 and wherein:
   a. said support means includes first and second arcuate sections joined together at one end and secured at their other ends to opposite ends of said horizontal portion.

4. A shield for controlling road spray as in claim 3 and wherein:
   a. said second cover member is secured at its perimeter to said horizontal portion and said arcuate sections.

5. A shield for controlling road spray as in claim 2 and wherein:
   a. said separator plate is secured to said horizontal portion and depends therefrom.

6. A shield for controlling road spray as in claim 1 and including:
   a. a flexible shield secured to and depending from said separator plate.

7. A shield for controlling road spray as in claim 1 and wherein:
   a. said means for securing said support means includes an arm extending therefrom.

8. In combination with a vehicle having a frame and at least one set of tandem wheels including a front wheel and a rear wheel, a shield for controlling road spray comprising:
   a. support means having an inboard and an outboard side,
   b. said support means being secured on its inboard side to said vehicle frame and including a portion above the wheels of said set,
   c. a vertical separator plate secured to and depending from said portion,
   d. said separator plate being positioned between said front and rear wheels,
   e. a downwardly extending director plate secured to said separator plate,
   f. said director plate extending from said separator plate toward said front wheel,
   g. cover means on the outboard side of said support means for preventing discharge of lateral spray, and
   h. a cover member secured to said portion.

9. A shield for controlling road spray as in claim 8 and wherein:
   a. said support means includes front and rear downwardly concave arcuate sections secured to and depending from opposite ends of said portion and joined together between said front and rear wheels.

10. A shield for controlling road spray as in claim 9 and wherein:
    a. said cover means comprises a plate secured at its perimeter to said portion and said arcuate sections.

11. A shield for controlling road spray as in claim 8 and including:
    a. a flexible shield secured to and depending from said separator plate.

12. A shield for controlling road spray as in claim 8 and wherein:
    a. said support means includes an arm extending laterally from the inboard side thereof and secured to said vehicle frame.

* * * * *